United States Patent [19]
Farrington et al.

[11] Patent Number: 5,189,464
[45] Date of Patent: Feb. 23, 1993

[54] SUPPLEMENTAL LENS POSITIONING SYSTEM FOR A FIXED FOCUS LENS CAMERA

[75] Inventors: David L. Farrington, Boxborough; Norman D. Staller, Beverly; Jon E. Van Tassell, Concord, all of Mass.

[73] Assignee: Polaroid Corporation, Cambridge, Mass.

[21] Appl. No.: 809,330

[22] Filed: Dec. 18, 1991

[51] Int. Cl.$^5$ .............................................. G03B 13/36
[52] U.S. Cl. ..................................................... 354/403
[58] Field of Search ............................. 354/403, 415

[56] References Cited

U.S. PATENT DOCUMENTS

| | | | |
|---|---|---|---|
| 4,148,574 | 4/1979 | Johnson | 354/401 |
| 4,336,988 | 6/1982 | Johnson | 354/266 X |
| 4,357,083 | 11/1982 | Johnson et al. | 354/403 |
| 4,643,555 | 2/1987 | Wakabayshi | 354/403 |
| 4,660,954 | 4/1987 | Fujita et al. | 354/403 |
| 4,894,678 | 1/1990 | Farrington et al. | 354/415 |

Primary Examiner—W. B. Perkey
Attorney, Agent, or Firm—John J. Kelleher

[57] ABSTRACT

A simplifed open loop focus control system for a fixed focus lens camera that positions a supplemental lens into the optical path of a fixed focus lens, for relatively remote subjects, in response to a signal representative of subject reflectivity. Inserting such a lens in this manner substantially reduces focus control system complexity while at the same time minimizing the frequency of supplemental lens movement for most exposures which are typically of subjects that are relatively close to the fixed focus lens camera.

9 Claims, 4 Drawing Sheets

SUPPLEMENTAL LENS POSITIONING SYSTEM FOR A FIXED FOCUS LENS CAMERA

BACKGROUND OF THE INVENTION

1. Field of the Invention

The present invention relates to a focus control system for photographic apparatus, in general, and to a simplified focus control system for positioning a supplemental lens into and out of the optical path of a fixed focus lens in such apparatus, in particular.

2. Description of the Prior Art

Systems in which the objective lens of a camera may be automatically focused on a subject are well known in the prior art. In commonly owned U.S. Pat. No. 4,357,083 to Johnson et al., for example, a method and apparatus are disclosed wherein means are provided for actuating a light source to thereby illuminate a scene to be photographed with artificial illumination. Light sensing means including a photodetector are employed to provide a range signal responsive to the intensity of reflected radiation which may then be employed to adjust the focus of a variable focus lens, for image focusing purposes.

In commonly owned U.S. Pat. No. 4,148,574 to Johnson, a focusing system for a photographic camera employs ultrasonic energy for focusing a single adjustable focus lens having two focal positions. Ultrasonic energy is transmitted toward a subject to be photographed and the reflection of such energy from the subject is subsequently detected. Characteristics including the time duration between ultrasonic energy transmission and detection are electronically processed to develop a control signal representative of the distance between the subject and the camera. The control signal is then used to select one of the two focal positions of the two focal position lens that will focus the sharpest image of the subject to be photographed at the focal plane of the camera.

In commonly owned U.S. Pat. No. 4,336,988 to Johnson, a lens focusing system for a photographic camera which includes a plurality of discrete lens elements, wherein each of the lens elements has a different focal length, is disclosed. The lens elements are mounted in a circumferentially spaced-apart relation on a rotatably mounted lens disc for rotation about a disc center axis. The lens focusing system further includes an ultrasonic ranging system for measuring the photographic camera-to-subject distance and for deriving a signal representative thereof. A combination of a lens disc drive coupled to the lens carrying disc and a disc stopping pawl, responsive to the camera-to-subject distance signal, stop the rotating lens disc and thereby locate a lens element in an optical axis of the camera that will form the sharpest image at the camera's focal plane.

While the above-described lens focusing systems have achieved various degrees of success, they generally utilize large numbers of components which make such lens focusing systems relatively large and complex for optimum camera packaging purposes and/or relative costly to economically produce.

SUMMARY OF THE INVENTION

In accordance with the teachings of the present invention a simplified open loop focus control system is provided for positioning a supplemental lens into an optical path of a fixed focus lens in a photographic camera. The focus control system comprises a supplemental lens mounted for movement into and out of the optical path of the camera's fixed focus lens, an electronic flash and sensing means for sensing subject reflectivity and for generating a signal representative thereof in response to illumination generated by the electronic flash and reflected from a subject to be photographed. Subject reflectivity is measured prior to an exposure interval and the signal representative of subject reflectivity is employed in the determination of whether or not to insert the supplemental lens into the optical path of the fixed focus lens.

It is a primary object of the present invention, therefore, to provide a simplified focus control system for a fixed focus lens camera of the type that employs a supplemental lens to extend the focusing range of the camera.

It is another object of the present invention to provide a focus control system for a fixed focus lens camera employing a movably mounted supplemental lens that will minimize the frequency of supplemental lens movement for subjects located at relatively close subject distances.

It is a further object of the present invention to provide a supplemental lens for a fixed focus lens camera and a control system therefor that will occupy minimum space within the camera.

Other objects, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
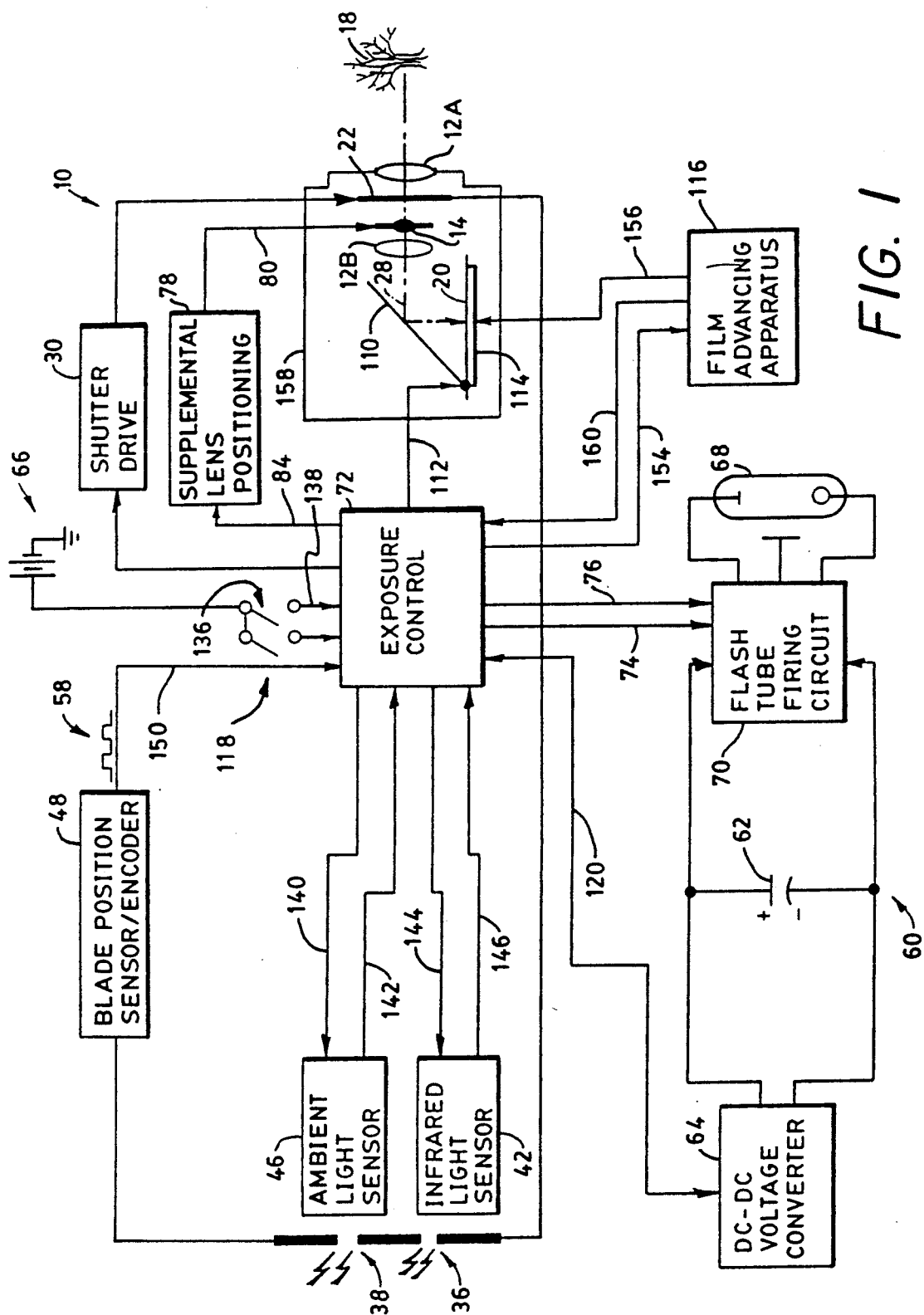
FIG. 1 is a schematic diagram of a fixed focus lens camera which incorporates a preferred embodiment of the simplified supplemental lens positioning systems of the present invention.

Referring now to the drawings, and specifically to FIG. 1, there is shown a scanning aperture single lens reflex camera 10, preferably of the self-developing type, which incorporates a preferred embodiment of the simplified supplemental lens positioning system of the present invention. The camera 10 includes a fixed focus lens system comprising a front objective lens element 12A and a rear objective lens element 12B spaced therefrom mounted in a fixed position with respect to the camera 10. In addition, the camera 10 includes a supplemental lens 14 mounted on a rotatably mounted lens carrier 16. The supplemental lens 14 is interposed between the lens elements 12A and 12B in response to the sensed level of scene or subject reflectivity. The supplemental lens 14, in conjunction with the objective lens elements 12A and 12B, focus imaging-carrying light rays of, for example, a relatively remote subject 18 on photosensitive material located in a film plane 20 of the camera 10. The operation of the lens carrier 16 and the supplemental lens mounted thereon, in conjunction with the lens elements 12A and 12B, will be described in much greater detail below with respect to drawing FIGS. 3 and 4.

Figure 2A:
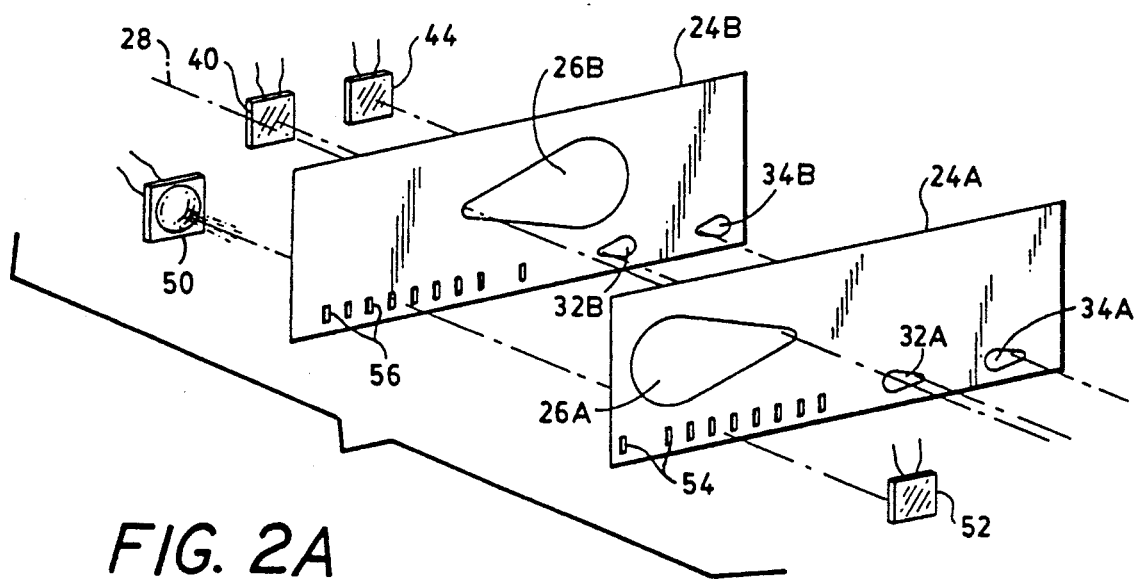
FIG. 2A is an exploded perspective view of a portion of a scanning type shutter blade mechanism schematically shown in FIG. 1.
Figure 2B:
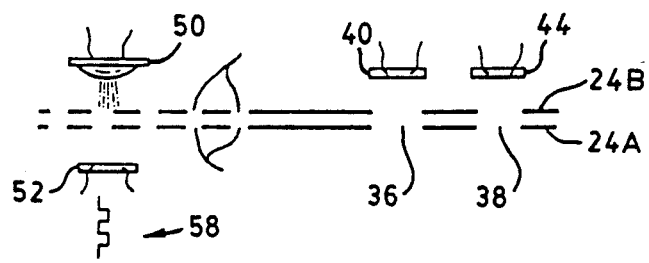
FIG. 2B is a top view, partly in section, of the shutter blade mechanism of FIGS. 1 and 2A shown in the compact arrangement utilized during a normal exposure cycle.

With additional reference to FIGS. 2A and 2B, a blade mechanism 22, positioned intermediate the front lens element 12A and the rear lens element 12B, immediately in front of the interposed supplemental lens 14, includes a pair of overlapping shutter blade elements 24A and 24B of the "scanning" type. Scene light admitting primary apertures 26A and 24B, are respectively provided in the blade elements 24A and 24B to cooperatively define a progressive and predictable variation of effective aperture openings in accordance with simultaneous displacement of one blade element with respect to the other blade element in a manner more fully described in commonly assigned U.S. Pat. No. 3,942,183 to Whiteside, now specifically incorporated herein by reference. The blade element apertures are selectively shaped and positioned so as to overlie an optical path 28 of the camera 10 thereby defining a gradually varying effective aperture size as a function of the position of the blades of the blade mechanism 22. The optical path 28 is coincident with the optical axis of the objective lens elements 12A and 12B.

A shutter drive 30 is provided for displacing the blade elements 24A and 24B of the blade mechanism 22. The shutter drive 30 includes a tractive electromagnetic device in the form of a solenoid 31 (FIG. 4) employed to displace the shutter blade elements with respect to one another in a manner more fully described in the above-cited Whiteside '183 patent. When actuated by the shutter drive 30 to generate an exposure interval, the aperture formed by the blade mechanism 22 changes, as a function of time, in a known and quite predictable manner. The size of the aperture at any point in time during an exposure interval can be determined in a conventional manner by, for example, knowing the amount of time that has elapsed from the time that the blade mechanism is initially actuated to generate an exposure interval, to a particular point in time which would relate to a corresponding aperture size as might be determined by a conventional blade position encoder.

Each of the blade elements 24B and 24B of the blade mechanism 22 includes two secondary apertures 32A, 34A and 32B, 34B, respectively. The aperture 32A in the blade element 24A cooperates with the aperture 32B in the blade element 24B to form an opening 36 and the aperture 34A in blade 24A cooperates with aperture 34B in blade 24B to form an opening 38 through the blade mechanism 22. These cooperating secondary apertures may be configured to track in a predetermined corresponding relationship with respect to the scene light admitting primary apertures 26A and 26B. With the primary and secondary apertures being formed in the same blade element and therefore being mechanically coupled to one another, it is readily apparent that the secondary apertures can move in the same manner as the primary apertures when the blade elements 24A and 24B are displaced, in the above-described manner, with respect to one another. The amount of artificial light admitted to the film plane 20 through the primary apertures 26A and 26B is controlled by a signal generated by a combination of an infrared photosensitive element 40 and an integrator (not shown) within an infrared light sensor 42 that senses and integrates a corresponding amount of infrared scene energy through the opening 36. The amount of ambient scene light admitted to the film plane 20 through these primary apertures is controlled by a signal generated by a combination of a visible light photosensitive element 44 and an integrator (not shown) within an ambient light sensor 46 that senses and integrates a corresponding amount of visible ambient scene light, through the opening 38. An example of scanning blade elements having primary and secondary apertures that cooperate to control the amount of scene light admitted to a film plane is shown in U.S. Pat. No. 3,942,183, above.

The camera 10 is provided with a blade position sensor/encoder 48. The sensor/encoder 48 senses the position of the blade elements 24A and 24B with respect to one another and generates a signal representative of relative blade element position. The sensor/encoder 48 comprises a light emitting diode 50, a photosensor 52 spaced therefrom and a plurality of narrow slots or openings 54 and 56 in the blade elements 24A and 24B, respectively. The slots 54 and 56 are rectangular in shape, are of uniform size and except for an initial slot, are equally spaced in a linear direction in their respective blade elements. The slots 54 and 56 are collectively interposed between the light emitting diode 50 and the photosensor 52 such that they alternately block and unblock the transmission of light between these two components to thereby cause the photosensor 52 to generate one or more pulses 58 representative of the relative position of the blade elements 24A and 24B. The position of the blade element 24A with respect to the blade element 24B defines the size of the effective or taking aperture formed by the primary apertures 26A and 26B in the blade mechanism 22. Therefore, the relative position of the blade elements 24A and 24B represented by the pulse or pulses 58 is also a measure of the size of the effective or taking aperture formed by the primary apertures 26A and 26B.

The camera 10 is also provided with an electronic flash apparatus 60 together with means for controlling its energization in order to determine subject reflectivity for subject distance-zone and best flash aperture related reasons prior to an exposure and to provide a portion of the exposure value required to illuminate a scene to be photographed. The electronic flash apparatus 60 comprises a main storage capacitor 62 which may be charged up to an operating voltage by any conventional voltage converter circuit (not shown) which would be included within a DC-DC voltage converter 64. The DC-DC voltage converter 64 operates in a conventional manner to convert a DC voltage as may be derived from a battery 66 in the camera 10, which can be in the order of 6 volts, to a suitable operating voltage such as 280 volts. A flash tube 68 of the electronic flash apparatus 60 is electrically coupled to the main storage capacitor 62 by a conventional flash tube firing circuit 70. The flash tube firing circuit 70 is, in turn, coupled to an exposure control 72 that generates flash firing and terminating commands on the output path 74 and 76, respectively, which control when and for how long the flash tube 68 illuminates a subject to be photographed with visible and infrared light.

Figure 3:
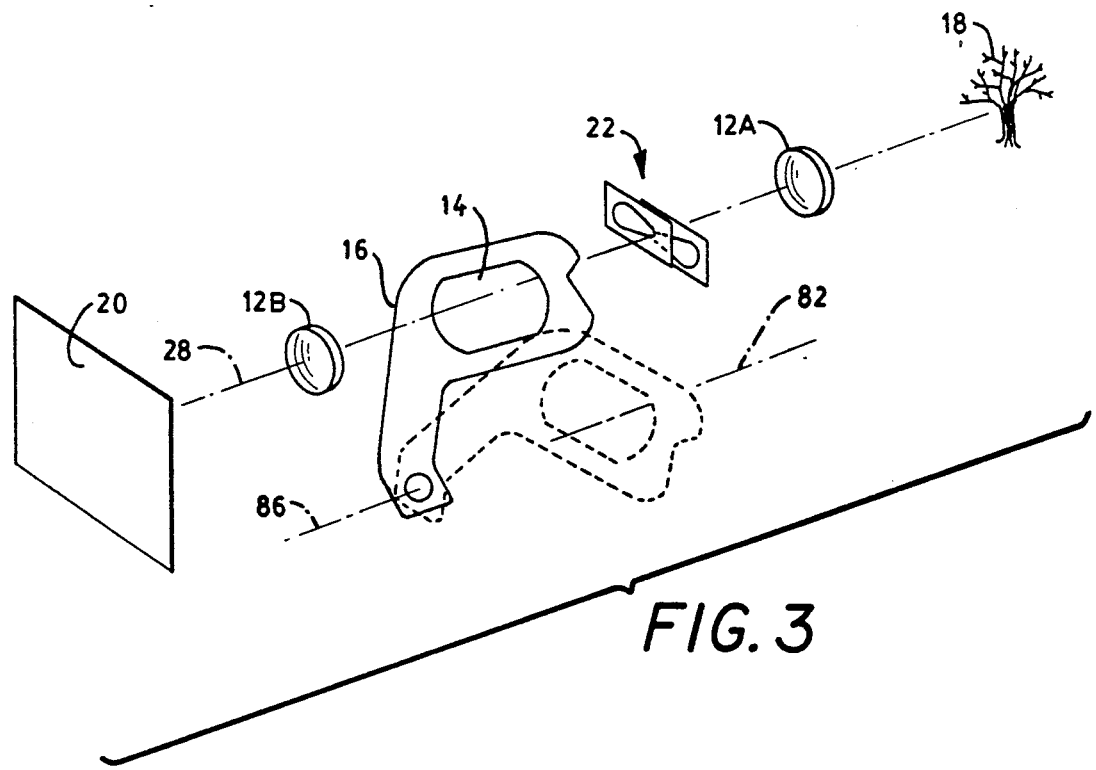
FIG. 3 is a schematic diagram, in perspective, illustrating the basic relationship between the fixed focus lens elements and the movable supplemental lens in the photographic camera of the present invention.

The camera 10 additionally includes a supplemental lens positioning system 78 which is coupled to the lens carrier 16 through a path 80. As best shown in FIG. 3, the lens positioning system 78 either positions or precludes the positioning of an optical axis 82 of the supplemental lens 14 into alignment with an optical axis 28 of the objective lens elements 12A and 12B in response to a scene reflectivity signal from the exposure control 72 on a path 84 (FIG. 1) derived by the infrared light sensor 42.

Figure 5:
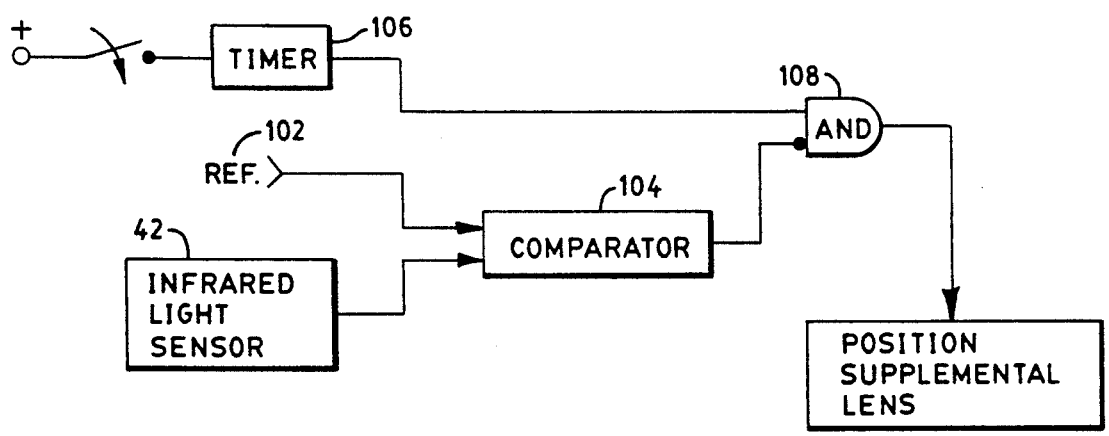
FIG. 5 is a schematic diagram showing that portion of the supplemental lens positioning system in the photographic camera of the present invention which controls the positioning of the supplemental lens incorporated therein.
Figure 4:
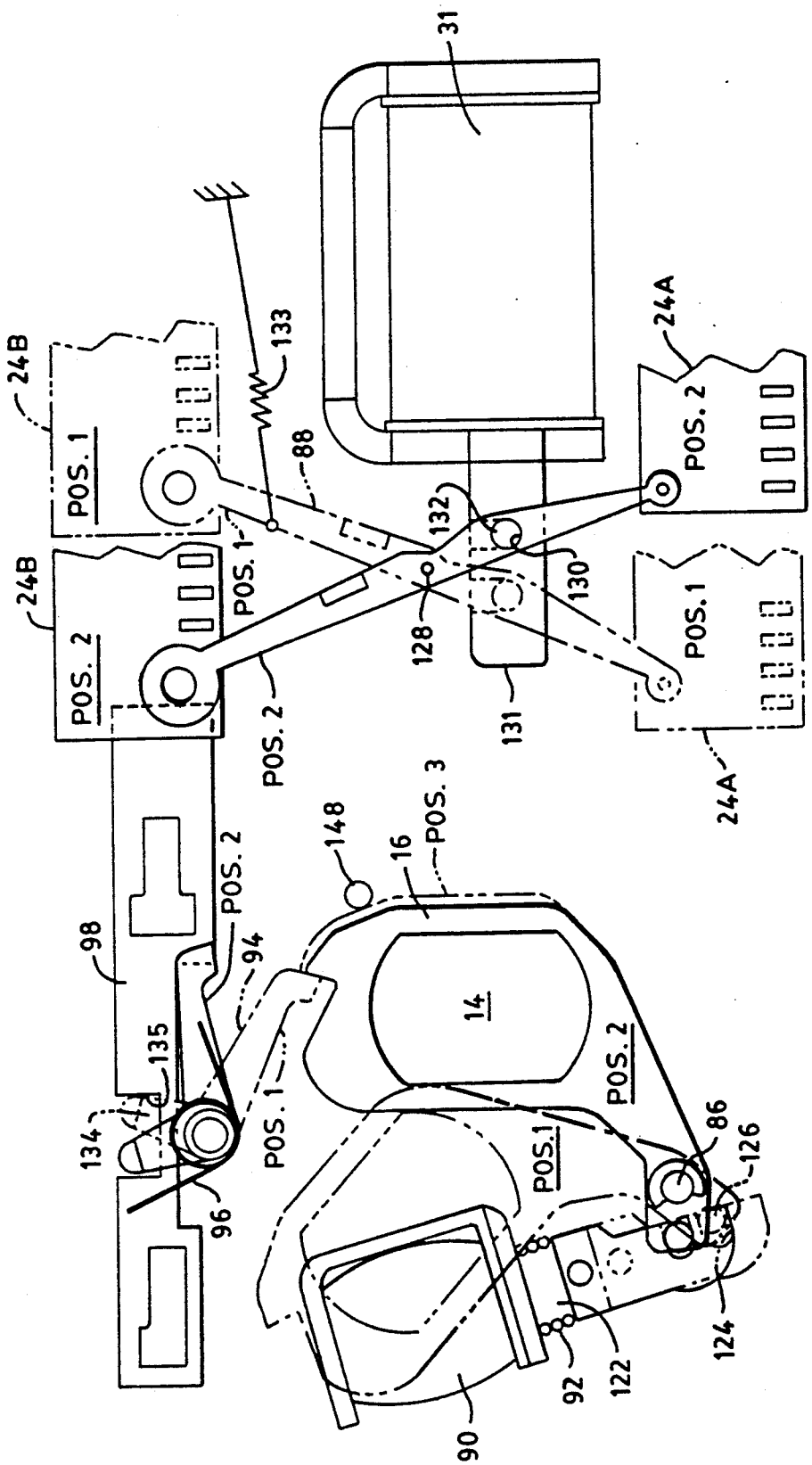
FIG. 4 is a front elevational view of the supplemental lens assembly and certain related components of a positioning system therefor.

With additional reference to FIGS. 3 and 4, the supplemental lens 14 forms a part of a supplemental lens system which includes the lens carrier 16 on which the lens 14 is mounted for rotation therewith about an axis 86, a shutter solenoid 31, a walking beam 88, a lens solenoid 90 including a lens solenoid return spring 92, a latch 94, a latch return spring 96 and a latch actuator 98. The supplemental lens 14 becomes the third element of a three element lens system when employed with the front lens element 12A and the rear lens element 12B to focus an image of relatively remote subjects at the film plane 20 of the camera 10. The supplemental lens 14 rotates about the axis 86 and during film exposure is located in one of two positions which is dependent upon the measured level of scene or subject reflectivity. With additional reference to FIG. 5, if the level of subject reflectivity is less than a predetermined arbitrary magnitude as established by a reflectivity reference signal 102, as sensed by the infrared light sensor 42 and as determined by the comparator 104, indicating that the subject to be photographed is located in a relatively remote distance-zone and a period of time equal to thirty-five microseconds has elapsed as determined by a timer 106, an AND gate 108 will be satisfied and the focus control system 78 will thereafter cause the optical axis 82 of the supplemental lens 14 to be positioned into alignment with the optical axis 28 of the lens elements 12A and 12B, between these two lens elements. If, however, the sensed level of reflectivity is equal to or greater than said predetermined magnitude, indicating that the subject to be photographed is in a relatively close distance-zone, the AND gate 108 will not be satisfied and therefore the supplemental lens 14 will continue to be stored out of alignment with the optical axis 28 of the lens elements 12A and 12B.

It should be noted that the reason for measuring subject reflectivity in order to position the supplemental lens is not for the purpose of determining the particular distance to a subject to be photographed. Subject reflectivity measurements are heavily influenced by such factors as subject size, subject reflectance, etc. and therefore, by themselves may not always be reliable indicators of subject distance. Subject reflectivity measurements for supplemental lens positioning purposes are made for the sole purpose of determining whether or not a subject is present within a relatively close distance-zone that extends approximately eight feet in front of the camera, or in a relatively remote distance-zone which extends outwardly from the relatively close distance-zone. The particular distance of the subject within either of these zones is unimportant. If the reflectivity signal level equals or exceeds the above-noted arbitrary threshold level then it is assumed that a subject is relatively close or within the relatively close distance-zone and therefore the supplemental lens is not employed. If the threshold level is not exceeded then it is assumed that a subject is relatively remote or within the relatively remote distance-zone and therefore the supplemental lens is employed.

As noted above, the camera 10 is preferably of the single lens reflex type and therefore includes a conventional folding reflex mirror 110 (FIG. 1) that is actuatable by the exposure control 72 through a path 112. The mirror 110 is actuatable, in a conventional manner, between a viewing position where it blocks the transmission of scene light to the film plane 20 and a taking or unblocking position as shown in FIG. 1, where it facilitates the transmission of scene light to the film plane 20 during an exposure interval.

The camera 10 is preferably designed for use with a self-developing film unit (not shown) similar to those described in U.S. Pat. No. 3,415,664 to Land, in common assignment herewith, which is specifically incorporated herein by reference. The self-developing film unit is packaged in a lighttight film cassette 114 shown in the condition assumed just after the cassette 114 has been fully inserted into the camera 10. The cassette 114 may enclose the 6 VDC battery 66.

Mounted within the camera 10 is a film advancing apparatus 116 similar to that described in U.S. Pat. No. 3,753,392 to Land that includes a motor for operating a gear train (neither shown) which is coupled with the film advancing apparatus 116 to provide for the continuous movement of an exposed film unit from an exposure position within the camera 10 toward the exterior thereof. The film advancing apparatus 116 additionally includes a film-engaging arm member (not shown) driven by the above-mentioned motor and gear train. The arm member is adapted to extend into a slot in the cassette 114, as shown in the above-noted Land '392 patent, and engage the uppermost film unit located therein at or near its trailing edge prior to moving it out of the cassette 114. The exposed film unit is subsequently moved into the bite of a pair of conventional processing rollers (not shown) by a pair of film unit edge-gripping edge rolls (also not shown). The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well-known in the art.

OPERATION

Typical focus and exposure cycles will now be described in detail. For the purpose of this description it is assumed that the taking aperture of the blade mechanism 22 is in its full open position, that the openings 36 and 38 formed by the secondary apertures in the blade mechanism 22 are also fully opened, that the mirror 110 is in its light blocking position, that the flash apparatus 60 has been energized by the prior manual closure of a switch 118 which coupled the battery 66 to the DC-DC voltage converter 64 through the exposure control 72 and a path 120 and that the main storage capacitor 62 is fully charged and ready for the initiation of an exposure cycle.

The supplemental lens 14 and the components relating thereto shown in FIG. 4 are part of a single lens reflex camera system, as previously mentioned. Therefore, when a camera user views a subject prior to exposure, he or she will be looking through the same optical system used for film exposure. While the camera 10 is in its viewing mode of operation the supplemental lens 14 is in a position 1 (shown dashed in FIG. 4) and is force biased against a motion limiting stop surface (not shown) by the expanded lens solenoid return spring 92 which surrounds the plunger 122 of the lens solenoid 90. In other words, in the viewing mode the supplemental lens 14 is out of the optical path 28 of the objective lens elements 12A and 12B.

The lens solenoid 90 is coupled to the supplemental lens 14 by a yoke 124 formed in the solenoid plunger 122 and a pin 126 projecting from the lens carrier 16 and engaging the yoke 124. The walking beam 88 is mounted for pivotal movement about an axis 128 by the shutter solenoid 31 which is coupled thereto in the same manner that lens solenoid 90 is coupled to the lens carrier 16. A yoke 130 formed in a solenoid plunger 131 of the solenoid 31 engages a pin 132 projecting from the walking beam 88. In the viewing mode the walking beam 88 is in a position 1 (shown dashed in FIG. 4) and is maintained in this position by a shutter blade opening spring 133. In addition, the latch 94 is rotated clockwise, as shown in FIG. 4, by the latch return spring 96 which, in turn, drives the latch actuator 98 to the right by means of an arm 134 projecting therefrom when it engages a surface 135 of the latch actuator 98 as the latch 94 is so rotated.

With continued reference to FIGS. 1-5 of the drawings, a switch 136 is actuated to a closed position by a camera operator to initiate focusing and exposure cycles. As noted above, camera 10 is of the single lens reflex type. Therefore, the closure of the switch 136 causes the shutter solenoid 31 to actuate the shutter blade elements 24A and 24B to their fully closed position in order to preclude scene light from reaching the film plane 20. Also, the closure of the switch 136 causes the exposure control 72 to actuate the reflex mirror 110 from its viewing or light blocking position where it precludes the transmission of image-carrying light rays to the film plane 20, to its light unblocking position (as shown in FIG. 1) where it facilitates the transmission of image-carrying light rays to the film plane 20 during an exposure interval, after the blade elements 24A and 24B are fully closed. In addition, the closure of the switch 136 couples the battery 66 to the exposure control 72 through a path 138. With the blade mechanism opening 38 formed by the secondary apertures 34A and 34B adjacent the ambient light sensor 46 in its full open position, the exposure control 72 enables the ambient light sensor 46, through a path 140, to integrate ambient visible light for a fixed period of time and then transmit the integrated value thereof back to the exposure control 72 through a path 142 for storage therein. This stored value of integrated ambient visible light is employed by the exposure control 72 during a subsequent exposure interval in a manner more fully described in U.S. Pat. No. 4,894,678 to Farrington et al., the disclosure in which is specifically incorporated herein by reference.

Also, when the switch 136 is actuated to the closed position the shutter solenoid 31 is energized to thereby cause the plunger 131 thereof (FIG. 4) to move to the right into an electrical coil (not shown) forming a part of the solenoid 31. The solenoid 31, which is coupled to the walking beam 88 through the above-described yoke 130 and pin 132 arrangement, drives the walking beam 88 in a counterclockwise direction to a position 2, as shown in FIG. 4. A pin (not shown) projecting from the back of the upper end of the walking beam 88 drives the latch actuator 98 to the left as viewed in FIG. 4 causing the latch 94 to be driven to a latch position 2. Power is maintained on the solenoid 31 in order to keep the latch 94 in the latch position 2.

The closure of the switch 136 additionally causes the exposure control 72 to activate the infrared light sensor 42 with an activation signal on a path 144 and to initiate the firing of the electronic flash apparatus 60 with a flash firing signal on the path 74. Thirty-five microseconds later, the exposure control 72 transmits a flash terminating command on the path 76 to extinguish the light output from the flash apparatus 60. At the same time, the exposure control 72 also sends a de-activation signal on the path 144 to de-activate the infrared light sensor 42.

This thirty-five microsecond burst of artificial light from the flash apparatus 60 is sometimes referred to as a wink pulse. A signal representative of the infrared portion of the reflected artificial light that is sensed and integrated by the infrared light sensor 42 during this thirty-five microsecond period of time is routed to the exposure control 72 through a path 146. The signal generated by the infrared sensor 42, at this time, is a measure of subject reflectivity. This subject reflectivity signal is routed to the comparator 104 (FIG. 5) within the exposure control 72 where it is compared with the reflectivity reference signal 102 as previously explained. If the sensed subject reflectivity signal is less than the reference signal 102, indicating the absence of a subject within the relatively close distance-zone, the lens solenoid 90 is energized and the lens solenoid plunger 122 is drawn into the lens solenoid 90 thereby rotating the supplemental lens carrier 16 and the lens 14 mounted thereon into a lens position 3 up against a stop 148. The lens position 3 is an overtravel position and not a picture taking position. Power is temporarily maintained on the lens solenoid 90 thereby maintaining the lens carrier 16 against the stop 148.

The shutter blade elements 24A and 24B each have one end thereof attached to opposite ends of the walking beam 88. At position 2 of the walking beam 88 the shutter blade elements 24A and 24B overlap so as to preclude scene light from reaching a film unit at the film plane 20. With power maintained on lens solenoid 90, power is removed from the previously energized shutter solenoid 31, causing the force of the shutter blade opening spring 133 to rotate the walking beam 88 clockwise as viewed in FIG. 4 toward walking beam position 1. The latch actuator 98 under the action of the latch return spring 96 is now able to rotate the latch 94 from latch position 2 to latch position 1.

The shutter blade elements 24A and 24B include the blade position encoder slots 54 and 56, respectively, as previously explained. As the walking beam 88 continues to rotate clockwise toward walking beam position 1, the blade position signal 58 is generated by the photosensor 52 within the blade position sensor/encoder 48 when the encoder slots 54, 56 pass between the light emitting diode 50 and the said photosensor 52. The blade position signal 58 consists of an initial pulse indicating that the shutter blade elements 24A and 24B are moving but have not traveled enough to allow scene light to strike the film plane 20 and then a series of equally spaced pulses indicating the extent to which a scene light admitting aperture is being formed by the shutter blade elements 24A and 24B. When the initial blade position pulse signal is generated by the blade position sensor/encoder 48, it is routed to the exposure control 72 on a path 150. Upon receipt of this initial blade position pulse signal, the exposure control 72 sends a solenoid de-energization signal to the supplemental lens positioning system 78 on the path 84 causing the interruption of electrical power to the lens solenoid 90. When the lens solenoid 90 is de-energized, the force of the expanding solenoid return spring 92 rotates the supplemental lens 14 counterclockwise from overtravel position 3, as viewed in FIG. 4, into engagement with the end of the latch 94 which, at this point in time, is in latch position 1. The supplemental lens 14 in conjunction with objective lens elements 12A and 12B is now in the correct position to focus an image of a relatively remote subject, or a subject within the relatively remote distance-zone, at the film plane 20 of the camera 10.

The walking beam 88 continues to rotate in a clockwise direction, as viewed in FIG. 4, after causing the above-noted initial blade position pulse signal to be generated by the blade position sensor/encoder 48 in combination with the initial slots of the encoder slots 54 and 56 of the blade elements 24A and 24B, respectively. As the primary shutter blade elements 24A and 24B continue to move in response to such walking beam 88 rotation, a light admitting aperture is formed by the blade elements 24A and 24B, thus allowing scene light to strike the film plane 20 and thereby produce the desired photographic exposure. After the desired exposure is complete the exposure control 72 causes the reflex mirror 110 to be actuated to its light blocking position. The exposure control 72 then causes the shutter solenoid 31 to be re-energized causing the plunger portion 131 thereof to move within the solenoid 31 and thereby move the walking beam 88 to the walking beam position 2. As the walking beam 88 moves toward the walking beam position 2, the previously mentioned pin (not shown) projecting from the rear of the upper end thereof engages the latch actuator 98 which, in turn, engages the latch 94 and thereby moves the latch 94 to latch position 2. The supplemental lens 14 is then returned to lens position 1 under the action of the expanding solenoid return spring 92 thus returning the supplemental lens system to its initial or non-focusing positions out of the optical path 28 of the objective lens elements 12A and 12B.

The exposure control 72 also actuates the film advancing apparatus 116 and the drive motor (not shown), through a path 154, to initiate the transport and processing of the exposed, self-developing film unit. The film advancing apparatus 116, in turn, moves the exposed film unit located in the cassette 114, through a path 156, into the bite of the pair of processing rollers (not shown), in the manner described above, to spread processing liquid between certain film layers to initiate the formation of a visible image within the film unit. After the mirror 110 has been actuated to its light blocking position where it precludes the passage of light to the film plane 20, the exposure control 72 actuates the shutter drive 30 and the shutter mechanism 22 coupled thereto such that the primary or taking aperture thereof is placed in its fully opened position by the movement of the walking beam 88 to a walking beam position 1 under the influence of the blade opening spring 133. After the film advancing apparatus 116 has moved the exposed film unit through the above-mentioned pair of rollers, a film movement completion signal is routed to exposure control 72 through a path 160. Upon receipt of this film movement completion signal, the exposure control 72 initiates the charging of electronic flash apparatus 60 through the path 120. When the main storage capacitor 62 of the electronic flash apparatus 60 is fully charged, as sensed through the path 120, the exposure control 72 then places the exposure control system of the camera 10 in condition for the initiation of the next exposure cycle.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed:

1. A focus control system for photographic apparatus having means for defining a film plane, said focus control system comprising:

a first lens mounted in a fixed position on the apparatus for directing image-carrying light rays along an optical path from a subject to be photographed, located within a first distance-zone, to the film plane;

a second lens mounted for movement between a first position where, in combination with said first lens, it directs image-carrying light rays along said optical path from a subject to be photographed to the film plane, the subject being located within a second distance-zone which is more remote from the apparatus than said first distance-zone, and a second position displaced from said optical path;

drive means coupled to said second lens for moving said second lens between its said first and second positions;

an energizable light source for illuminating the scene for a predetermined period of time with artificial light prior to an exposure interval;

means for determining if a predetermined amount of time has elapsed since the artificial light has been emitted and for generating a first signal representative thereof;

light sensitive means for detecting artificial light emitted by said light source and reflected from a subject to be photographed and for generating a second signal representative of subject reflectivity; and signal detecting means, responsive to said first and second signals, for determining if said second-signal has or has not been generated within said predetermined period of time; and control means 1) for energizing and de-energizing said light source to illuminate a subject to be photographed for said predetermined period of time, and 2) responsive to said signal detecting means for subjects located within said second distance-zone, for actuating said drive means to move said movably mounted second lens from its said second position to its said first position if said signal detecting means determines that said second-signal has not been generated within said predetermined period of time.

2. The focus control system of claim 1 wherein said first lens comprises two spaced-apart lens elements and said second lens is interposed between said lens elements by said drive means if said signal detecting means determines that said second signal has not been generated within said predetermined period of time.

3. The focus control system of claim 1 wherein said control means includes means for establishing a reference signal representative of a predetermined level of subject reflectivity, and said control means is responsive to said second signal to so actuate said drive means if the magnitude of said second signal is less than said subject reflectivity reference signal during said entire predetermined period of time.

4. The focus control system of claim 3 wherein said control means includes a comparator for determining if said second signal remains less than or exceeds said subject reflectivity reference signal during said predetermined period of time.

5. The focus control system of claim 1 wherein said artificial light illuminates the scene to be photographed with light having both visible and infrared components and the light sensitive means senses the infrared component of the artificial light reflected from the scene and generates said second signal in response thereto.

6. The focus control system of claim 1 wherein said second lens is mounted on a rotatably mounted support member and said drive means rotates said second lens between its said first and second positions.

7. A photographic apparatus having means for defining a film plane comprising:

a first lens mounted in a fixed position on the apparatus for directing image-carrying light rays along an optical path from a subject to be photographed, located within a first distance-zone, to the film plane;

a second lens mounted for movement between a first position where, in combination with said first lens, it directs image-carrying light rays along said optical path from a subject to be photographed to the film plane, a subject being located within a second distance-zone which is more remote from the apparatus than said first distance-zone, and a second position displaced from said optical path;

a blade mechanism mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of light to the film plane, said blade mechanism serving to provide an exposure aperture through which scene light passes when said blade mechanism is actuated between its said light blocking and unblocking arrangements to produce an exposure interval;

first drive means for displacing said blade mechanism between its said blocking and unblocking arrangements to define said exposure interval;

second drive means coupled to said second lens for moving said second lens between its said first and second lens positions;

an energizable light source for illuminating the scene for a predetermined period of time with artificial light prior to an exposure interval;

means for determining if a predetermined amount of time has elapsed since the artificial light has been emitted and for generating a first signal representative thereof;

light sensitive means for detecting artificial light emitted by said light source and reflected from a subject to be photographed and for generating a second signal representative of subject reflectivity; and signal detecting means, responsive to said first and second signals, for determining if said second signal has or has not been generated within said predetermined period of time; and control means 1) for energizing and de-energizing said light source to illuminate a subject to be photographed for said predetermined period of time, 2) responsive to said signal detecting means for subjects located within said second distance-zone, for actuating said second drive means to move said movably mounted second lens from its said second position to its said first position if said signal detecting means determines that said second signal has not been generated within said predetermined period of time, and 3) for actuating said first drive means to effect displacement of said blade mechanism to produce said exposure interval.

8. The photographic apparatus of claim 7 wherein said second lens is mounted on a rotatably mounted support member and said second drive means rotates said second lens between its said first and second positions.

9. The photographic apparatus of claim 7 wherein said first lens comprises two spaced-apart lens elements and said second lens is interposed between said lens elements by said second drive means if said signal detecting means determines that said second signal has not been generated within said predetermined period of time.

* * * * *